July 4, 1950 L. W. PARKER 2,513,354
DRIFT COMPENSATED DIRECT CURRENT AMPLIFIER
Filed Aug. 10, 1946
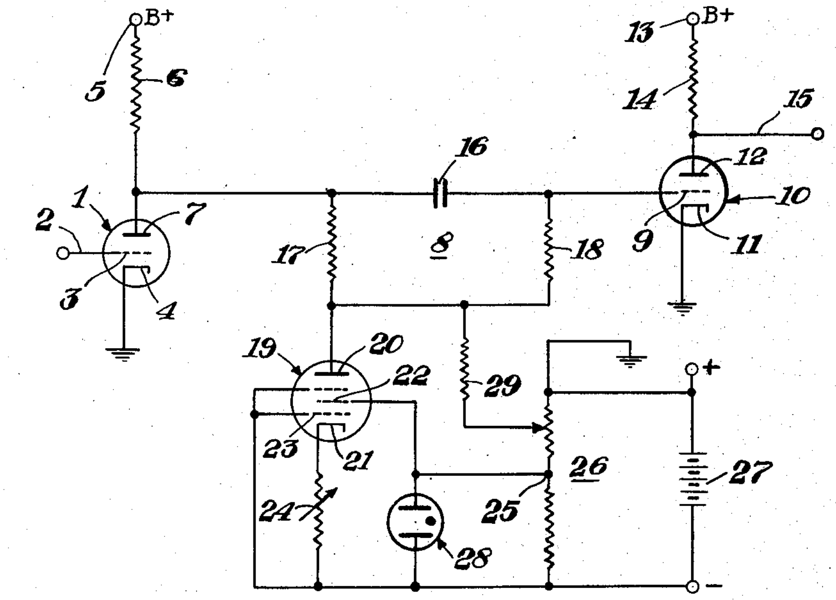
INVENTOR.
LOUIS W. PARKER
BY
R P Morris
ATTORNEY Patented July 4, 1950

2,513,354

UNITED STATES PATENT OFFICE 2,513,354

DRIFT COMPENSATED DIRECT-CURRENT AMPLIFIER

Louis W. Parker, Jackson Heights, N. Y., assignor to Federal Telecommunication Labs., Inc., New York, N. Y., a corporation of Delaware Application August 10, 1946, Serial No. 689,799

2 Claims. (Cl. 179—171)

This invention relates generally to direct current amplifier devices, and particularly to such devices which are compensated for drift.

It is well known in the art that direct current amplifiers tend to be troubled by slow drifts in D. C. plate current, resulting from changes in power supply voltages, or from other causes. Such variations are amplified in precisely the same manner as applied D. C. signals, since the amplifier cannot distinguish between desired and undesired voltages impressed thereon. It is, accordingly, essential in designing D. C. amplifiers, to provide devices or mechanism for balancing out or otherwise eliminating or counter-balancing to the maximum extent possible the effects of such drifts.

It is an object of the present invention to provide a drift compensated D. C. amplifier.

It is a further object of the invention to provide a drift compensated video amplifier device in which the gain of the device is modified for the D. C. components of a video signal, without modifying the gain for the A. C. components of that signal.

It is still a further object of the invention to provide circuits for increasing the gain of a D. C. amplifier device when a voltage drift of greater than a predetermined amount occurs in one sense and for decreasing the gain when the drift takes place in another sense, whereby to maintain accurate D. C. amplification over a predetermined range.

It is another object of the invention to provide drift compensation in D. C. amplifiers by means of regulating devices which operate only in response to drifts of greater than a predetermined amount.

The above and still further objects and advantages of the invention will become evident upon study of the following detailed description of an embodiment thereof, taken in conjunction with the accompanying drawings, wherein the single figure is a schematic circuit diagram of an embodiment of the invention.

In general, in the practice of the present invention, a video signal is transferred from the plate of one amplifier tube to the grid of a succeeding amplifier tube over a coupling condenser and a coupling resistance network which are connected in parallel, the coupling condenser serving to pass the A. C. components of the video signal, and the resistance network the D. C. component. In order to transfer moderate variations of D. C. character from the plate of the first tube, aforementioned, to the grid of the succeeding tube, while compensating for or reducing transferred voltages of considerable magnitude, and which are due to drift of applied voltages, I utilize a constant current device and a thyrite stabilizing resistance in parallel, and which are connected in series with a portion of the coupling resistance network. Suitable voltage is applied to the thyrite from an auxiliary source of such voltage in such manner as to cause zero voltage to appear across the thyrite during existence of a normal D. C. component at the plate of the first tube.

Upon occurrence of moderate variations in the D. C. component, the action of the compensating circuit is negligible since voltage drop existing in the series connected portion of the resistance network is maintained constant by the aforementioned constant current device. A considerable increase in the D. C. potential at the plate of the first tube, on the other hand, results in a considerable modification of voltage across the thyrite stabilizing resistance, causing an accelerating or non-linear change of resistance therein. Thereby, a change in current flow in the series connected portion of the resistance network takes place in such sense as to set up a compensatory voltage drop therein, which serves to reduce the magnitude of the D. C. variation.

By reason of the non-linear voltage internal resistance characteristic of thyrite, the compensatory voltage drop above referred to is of relatively small or negligible magnitude for moderate D. C. voltage variations in the amplifier, increasing sharply, however, as the D. C. voltage variations become of considerable magnitude.

Referring now to the drawing in detail, the numeral 1 denotes a vacuum tube which is utilized for amplification of a video signal which may be impressed over lead 2 between grid 3 of the tube 1 and ground. The cathode 4 of tube 1 is grounded and plate potential is applied from a source (not shown) to terminal 5, which is connected via load resistance 6 to the plate 7.

Variations in grid potential at grid 2, which may be produced by video signals applied thereto, produce corresponding variation in plate current, and consequently in the potentials of the plate 7. The latter potentials are impressed over a coupling circuit, denominated generally by the numeral 8, to the grid 9 of a tube 10, the latter further comprising at least a cathode 11 and a plate 12, the cathode 11 being grounded and the plate 12 being supplied with D. C. voltage from a terminal 13 over a load resistance 14. Amplified video signals are available, with the above arrangement, on lead 15, and may be utilized for any desired purpose.

Alternating current components of the video signal applied to the grid 3 of the tube 1 are applied to the grid 9 of the tube 10, after amplification by the action of the tube 1, over a coupling condenser 16, which is connected between plate 7 and grid 9.

D. C. potentials at the plate 7 are transferred to the grid 9 of the tube 10 over resistances 17 and 18 in series, the resistance 18 serving as a grid leak for the tube 10.

It will be clear from the above description, that, so long as tube 1 operates on a linear portion of its characteristic, the A. C. component of a video signal applied to the grid 2 will be translated to the grid 9 of tube 10 without distortion, and that variations in voltage at the terminal 5 which are not sufficiently great to shift operation of tube 1 to a non-linear portion of its characteristic will have no effect on its amplification relative to such signals. On the other hand, the D. C. component of video signals applied to the grid 3 produces precisely the same effect as does the variation or drift of the applied D. C. operating voltage.

In order to compensate for the drift of D. C. operating potentials applied to the tube 1, I connect the low potential end of the resistance 17 in series with a well-screened pentode tube 19, having a plate 20, a cathode 21, control grid 22 and screen grid 23. The screen grid 23 is operated at a negative potential which is determined by the voltage drop existing across the variable cathode resistance 24. The potential of the control grid 22 is determined by its connection to a point 25 on the potentiometer 26 which is connected across a source of potential 27, the high potential side of which is grounded, the total potential between control grid 22 and the low potential side of cathode resistor 24 being maintained substantially constant by the well known operation of the gaseous diode 28.

The bias voltages applied to the tube 19 are set at sufficiently high values to maintain the plate current in the said tube substantially independent of variations of potential at the plate 20 thereof.

By variations of the value of resistance 24 the current in the tube 19 is adjusted to have a value such that in flowing through resistance 17, a potential drop is developed having a magnitude equal to the average voltage for the tube 10, the grid 9 being thus maintained at a suitable negative bias. At the same time, stabilizing resistance 29 is connected from plate 20 of tube 19 to a point on potentiometer 26 which is precisely equal to the normal bias for the tube 10. It will be clear that under these conditions no potential will exist across stabilizing resistance 29, and that the amplifier will operate normally, the A. C. component of video signals reaching the grid 9 via condenser 16, and the D. C. component over resistances 17 and 18.

For stabilizing resistance 29, I utilize a thyrite having a characteristic as follows:

| Voltage across Thyrite | Resistance of Thyrite in Ohms |
|---|---|
| 6 v | $6\times10^7$ |
| 15 v | $15\times10^6$ |
| 25 v | $25\times10^6$ |
| 40 v | $4\times10^5$ |
| 65 v | $65\times10^3$ |

The reactions which take place in my novel amplifier to compensate for voltage drift, and the part which the thyrite stabilizing resistance 29 plays in these reactions will now be explained.

If we assume a moderate variation in the D. C. component of a video signal, the average potential between plate 7 and ground will vary similarly. Due to the constant current properties of the tube 19, however, the current flowing in resistance 17 will not change, and consequently the voltage drop thereacross will remain constant. The value of the potential at any point on resistance 17 with respect to ground will then follow variations in the potentials of plate 7 with respect to ground, and these variations will be thus transferred to the grid 9 over resistance 18.

Should we assume, however, a considerable rise in the D. C. plate voltage of the tube 1 the consequent rise with respect to ground of the potential on plate 20 produces a considerable drop in resistance in the thyrite stabilizing resistance 29, and a flow of current takes place through thyrite 29, which must be supplied over the resistance 17, increasing the voltage drop thereacross, and consequently decreasing the potential which would otherwise have been impressed on the grid 9.

Should we assume, on the other hand, a considerable drop in potential at the plate 7, the point of connection of the thyrite 29 to the potentiometer 26 will be at a higher potential than the plate 20, and some of the normal plate current for the tube 19 will be supplied over the thyrite stabilizing resistance 29, whereby the total current flow in the resistance 17, and consequently the voltage drop thereacross will diminish, and a greater voltage will be transferred from the plate 7 to the grid 9, than would otherwise be the case.

It will be clear, then, that the action of the thyrite stabilizing resistance and its associated circuits serves to set up a voltage drop in the resistance 17 which modifies the voltage with respect to ground of the plate 20 in such direction as to compensate for changes in the potential of the plate 7. This compensating effect is zero at normal values of potential of the plate 7, and increases at first slowly and then more and more sharply as the D. C. potential of plate 7 departs farther and farther from its normal value, due to the non-linear voltage characteristic of the stabilizing resistance 29. The stabilizing action does not affect amplification of A. C. signals, since these are transferred over condenser 16, and therefore their distortionless amplification depends on linearity of tube characteristics only.

While I have disclosed a specific embodiment of invention, it will be clear that modifications of the specific arrangement described and illustrated may be resorted to without departing from the spirit of the invention, which is defined in the appended claims.

What I claim and desire to secure by Letters Patent of the United States is:

1. A drift compensated amplifier comprising a first and a second source of potential, a first electron discharge tube having an output electrode connected to said first source, a second electron discharge tube having an input electrode, a two-portion resistance network having a common point, said network coupling said output electrode and said input electrode for transferring direct current components, means connected between said electrodes for transferring alternating current components, a constant-current device connected between the common point of said network and said first source, and a non-linear resistance connected between the common point of said network and said second source whereby variations in magnitude of said first source are compensated for in an opposite sense.

2. A drift compensated amplifier as claimed in claim 1, wherein said constant-current device comprises an additional electron discharge tube having a control electrode, an anode, a cathode, and a screen grid, a potentiometer connected across said second source, the control electrode of said last-named tube connected to a point on said potentiometer for applying a negative biasing potential thereon, a cathode resistor connected between the cathode and the screen grid of said last-named tube for applying a negative potential on said screen grid, a gaseous diode connected between said control gird and said screen grid, said non-linear resistance connected between the common point of said network and a point of potential on said potentiometer equal to the normal operating bias of said second tube, whereby the resistance of said non-linear resistance is maximum.

LOUIS W. PARKER.

REFERENCES CITED

The following references are of record in the file of this patent:

UNITED STATES PATENTS

| Number | Name | Date |
|---|---|---|
| 2,017,192 | Wolff | Oct. 15, 1935 |
| 2,369,138 | Cook | Feb. 13, 1945 |
| 2,392,415 | Soller | Jan. 8, 1946 |